United States Patent [19]

Moore et al.

[11] Patent Number: 4,809,200

[45] Date of Patent: Feb. 28, 1989

[54] APPARATUS AND METHOD FOR INSPECTING AND TESTING INDUSTRIAL POWER SAWS OR THE LIKE

[75] Inventors: Bill V. Moore; John A. Jackson, both of Greenville, Miss.

[73] Assignee: Cooper Industries, Houston, Tex.

[21] Appl. No.: 898,090

[22] Filed: Aug. 20, 1986

[51] Int. Cl.⁴ .................. G06F 15/46; B23D 49/16; B23Q 17/00

[52] U.S. Cl. .................................. 364/551; 364/475

[58] Field of Search ............... 364/550, 551, 559, 475

[56] References Cited

U.S. PATENT DOCUMENTS

| 4,350,953 | 9/1982 | Best et al. | 364/569 X |
|---|---|---|---|
| 4,367,051 | 1/1983 | Inoue | 364/569 X |
| 4,445,181 | 4/1984 | Yatman | 364/569 X |
| 4,539,632 | 9/1985 | Hansen et al. | 364/569 X |
| 4,583,280 | 4/1986 | Corrigan et al. | 364/569 X |

OTHER PUBLICATIONS

Hewlett-Packard: The HP-65 Fuly Programmable Pocket Calculator, publication 5952-6031D, Feb. 1974.

Primary Examiner—Felix D. Gruber
Attorney, Agent, or Firm—Alan R. Thiele; Eddie E. Scott

[57] ABSTRACT

A testing and inspection recording apparatus for use in recording the operating conditions and physical condition of a metal working tool such as a motor driven band saw or the like has a portable computing unit programmed to receive, store and reproduce information regarding the type of machine being tested, the physical condition of the machine, the particulars of the owner's name and location of the machine. The computer is programmed to calculate the cross-sectional area of a particular workpiece after inputting of data regarding one or more linear dimensions of the workpiece. Proximity switches are connected to the computing unit. The switches are mounted to measure the initiation and the completion of a cutting operation and the completion of an operating cycle of the machine. The computing unit is programmed to produce a field test analysis report giving full particulars of the machine, the material being cut, the operating tool or saw blade specification, the actual cutting time per cutting cycle and the cutting rate in area per unit time per cutting cycle. The computing unit is also programmed to produce a machine inspection report based on input data observed by the machine operator.

11 Claims, 7 Drawing Sheets

```
                               NICHOLSON                TEST # _____
                       Service With Advanced Technology DATE _____
                            Field Test Analysis        TIME _____
                                                         112      110
```

For:                                    Distributor:
        ⌐114                                     ⌐118
_____                       _____

Contact:                                Contact:
        116                                     ⌐120
_____                       _____

Thank you for testing our products. In order to assist
you in the evaluation process we are providing this detailed
information for your review. Please do not hesitate to contact
the above named distributor and/or sales representative if
you need additional information.

```
                    124⌐              ⌐126  128⌐  ⌐130   ⌐132
         122⌐ LENGTH  \  WIDTH   GAGE /  TPI  /   SET  \  BLD TYPE
BLADE TESTED:_____   _____   ___/___   __/__   __\__   _____
```

MACHINE:_____  MODEL NO:_____  SERIAL NO._____

COOLANT:_____  RATIO:_____  TRAVERSE RATE:_____

CONSUMER'S GOAL IN TESTING:_____

MATERIAL:_____                     SPECIFICATION:_____

HEAT TREATMENT: _____
                                     ⌐150
PIECES PER CUT:_____ SHAPE:_____  DIMS A X B X C X D

SQ. INS./CUT: _____  ⌐134                  — — — —

*BLADE BREAK-IN DATA
        ⌐136         ⌐138              ⌐140             142⌐
SFM:_____  RATE:_____  TIME/CUT:_____  NO. OF CUTS:_____

*PROPER BLADE BREAK-IN IS VERY IMPORTANT TO MAINTAIN BLADE
 LIFE AND SAWING RATES.

SAWING (AFTER BLADE BREAK-IN)
        ⌐144         ⌐146              ⌐148
SFM:_____  RATE:_____  TIME/CUT:_____

*Fig. 4a*                                              ⌐91

```
                        N I C H O L S O N          TEST # _____
             Service With Advanced Technology      DATE  _____
                      Field Test Analysis          TIME  _____
```

NOTE: Some target times may not be obtainable due to factors
      such as material condition, material deviation, coolant,
      etc.

| CUT NO. | PER CUT (TARGET) RATE | TIME | PER CUT (ACTUAL) RATE | TIME | ANALYSIS OF CUTTING TIME SLOW | ON TGT | FAST | AMPS |
|---|---|---|---|---|---|---|---|---|
| 1  | 5  | 2.50 | 5.50 | 2.28 |     |      | .22 | 7.0 |
| 2  | 5  | 2.50 | 4.50 | 2.79 | .29 |      |     | 6.9 |
| 3  | 5  | 2.50 | 5.00 | 2.51 |     | -.01 |     | 7.0 |
| 4  | 5  | 2.50 | 5.00 | 2.51 |     | -.01 |     | 7.0 |
| 5  | 6  | 2.09 | 7.00 | 1.79 |     |      | .30 | 7.1 |
| 6  | 6  | 2.09 | 6.50 | 1.93 |     |      | .16 | 7.2 |
| 7  | 6  | 2.09 | 5.75 | 2.18 | .09 |      |     | 6.9 |
| 8  | 6  | 2.09 | 6.00 | 2.09 |     |      |     | 7.0 |
| 9  | 6  | 2.09 | 6.00 | 2.07 |     | +.02 |     | 7.0 |
| 10 | 6  | 2.09 | 6.00 | 2.12 |     | -.03 |     | 7.0 |

AVG.

TOTAL SQUARE INCHES CUT _____

*Fig. 4b*

```
                    N I C H O L S O N              TEST #_____
           Service With Advanced Technology        DATE _____
                 SAW INSPECTION REPORT             TIME _____
                                                   112      110
```

CONSUMER'S NAME:_____ TELEPHONE:_____

CONSUMER CONTACT:_____

CONSUMER ADDRESS:_____

SALES ENGINEER:_____ TELEPHONE:_____

DISTRIBUTOR:_____ SLSMN:_____ PH.:_____

MACHINE:_____ MODEL:_____ SERIAL NO.:_____

The information listed below represents our evaluation of the saw used for testing our blades. These are the conditions which existed during the test.

INSPECTION CHECK LIST

OIL LVLS (HYD & TRANS) & HYD FILTER ----------------- GOOD
    COOLANT (QTY-CONDITION-FLOW RATE)------------------- GOOD
    ALL BELTS AND DRIVES -------------------------------- GOOD
    GUIDES (WEAR-INSTALLATION-PRESSURE) ----------------- GOOD
    GUIDE ARMS (SECURITY & POSITIONING) ----------------- GOOD
    BAND WHEEL & BEARING CONDITION ---------------------- GOOD
    BLADE TENSION --------------------------------------- GOOD
    BLADE TRACKING -------------------------------------- GOOD
    BLADE/WHEEL BRUSHES - CONDITION --------------------- GOOD
    GUIDE/BLADE/VISE BED ALIGNMENT ---------------------- GOOD
    SPEED CALIBRATION & MOTOR ROTATION ------------------ GOOD
    FEED/FEED RATE CALIBRATION -------------------------- GOOD
    WORK HEIGHTS & SLOW APPROACH CTRLS ------------------ GOOD
    LUBRICATION PRACTICES ------------------------------- GOOD
    SAFETY SWITCHES ------------------------------------- GOOD
    VISE HOLDING CAPACITY ------------------------------- GOOD
    FIT OF WAYS/SLIDES----------------------------------- GOOD
    FEED CLUTCHES/CTRLS (SPRINGS/HYDS) ------------------ GOOD
    BLADE HOLDER PIN CONDITIONS ------------------------- GOOD
    BLADE HOLDERS SECURED IN FRAME ---------------------- GOOD
    OVERALL MACHINE CONDITION --------------------------- GOOD

COMMENTS: MACHINE IS ALMOST NEW. IT IS IN GOOD CONDITION.

*Fig. 5*

```
                                           TEST #____
                  N I C H O L S O N        DATE_____
            Service With Advanced Technology  TIME_____

* * * * *

DANGEROUS MATERIAL NOTICE

* * * * *

Sawing the material described below is classified as
dangerous. Nicholson has attempted to summarize the hazards
and precautions associated with handling and cutting this
material as an aid to you. Nicholson specifically disclaims
any responsibility for the safe and proper handling of
dangerous materials. The owner and/or operator of the equip-
ment should be notified that cutting of dangerous materials
is planned. Sole responsibility for establishing and enforcing
safe operating procedures belongs to said owner and/or
operator.

ZIRCONIUM - FIRE HAZARD

Zirconium is dangerous because its chips can ignite and
burn. Fire prevention measures must be taken when cutting it.
Personnel should be educated on proper handling of it. It is
best cut dry.
    The single most effective safety measure for handling
this or any hazardous material is proper education and
training of personnel.
```

*Fig. 6*

APPARATUS AND METHOD FOR INSPECTING AND TESTING INDUSTRIAL POWER SAWS OR THE LIKE

BACKGROUND OF THE INVENTION

1. Field of the Invention

The present invention pertains to an apparatus and method for measuring and recording the condition and performance of material cutting machines such as industrial power saws. More particularly, a portable test unit adapted to prepare a printed copy of the material cutting machine specifications, operating conditions and other productivity parameters is provided.

2. Background

The operation of material cutting machines such as band saws, powered hacksaws and other types of metal cutting apparatus is subject to performance requirements which should be frequently observed or reviewed in order to discern when the productivity of these machines has fallen beneath design or optimum levels. It is also possible that the operational condition of the machine has created a danger to the operator.

Industrial power band saws, for example, are oftentimes operated with an improper blade for the particular type of material being cut, a dull blade, or some other less than optimum machine operating condition. Such operation requires excessive power demands and oftentimes dramatically shortens the useful life of the machine. Because industrial power band saws and the like do not have the technical sophistication of a computer controlled machine tool, they are often at the bottom of the routine maintenance priority list. This is unfortunate because the proper continued maintenance of a material cutting machine to assure operation at its optimal performance conditions can result in significant cost savings for a shop or factory owner.

Compounding the difficulty of analyzing the performance and operation of these material cutting machines and thus performing needed maintenance is the fact that this type of equipment is often located in an undisciplined factory setting where it may be placed in close proximity to other machine tools or busy material storage areas. Such locations make these machines difficult to analyze, to maintain and to service. Typically machines such as industrial power band saws are run until breakdown, then they are repaired and serviced. Oftentimes, such breakdown is accompanied by an injury to the machine operator.

It is normally the task of a saw sales engineer, maintenance engineer or plant industrial engineer to review the performance of a power saw, in the actual working environment of the saw itself. Such environment in conjunction with the limited time normally available to perform necessary tests and performance evaluations is not conducive to the type of thorough review and evaluation of saw operating conditions and performance necessary for an accurate analysis of all operating parameters. It is also considered desirable that the evaluation of the operating conditions and performance of a material cutting machine, such as a power band saw or the like, be presented in an easy to use format to provide a complete record of the operational history of the machine. Such record facilitates machine life maintenance reviews and planning an effective maintenance program. It is in resolution of these problems regarding analyzing and recording machine performance that the present invention has been developed.

Accordingly, there is thereby provided by the present invention an apparatus and method which will record and reproduce information regarding the operating condition and performance of a material cutting machine such as an industrial power saw and the like. Such apparatus and method is usable at the operating location of the material cutting machine and will produce, in a minimum amount of time, an easy to read record of the operational status of the machine for compiling an operational history and a programmed maintenance plan.

SUMMARY OF THE INVENTION

The present invention provides a unique apparatus and method for testing and recording information in the operational environment of a machine being tested. The resulting information describes the operating conditions of industrial metal working machines, particularly, industrial power band saws and hacksaws.

In accordance with one aspect of the present invention, the apparatus is provided with a timer for measuring and recording the time required to operate an industrial band saw or the like through an operating cycle and a power meter to record the motor current used during a cutting cycle. The apparatus also includes means for calculating both the cross-sectional area of the workpiece, and the area cutting rate of the saw. Additionally, the apparatus will receive and store predetermined input data describing desired cutting rates for particular saw blades. For recordkeeping purposes, the apparatus provides the user with a record of operational data in printed form.

In accordance with another aspect of the present invention, there is provided an apparatus which may be hand carried to the location of an industrial cutting machine. Data regarding the operating conditions of the machine may be recorded and analyzed and then reproduced in the form of a printout before the operator of the apparatus ever leaves the operational area of the machine.

The apparatus of the present invention has been configured to mount in a compact carrying case along with a preprogrammed digital computing unit including a central processing unit, an operator actuated keyboard, a document printer, and attendant visual displays of particular data generated during a test or evaluation process. The apparatus is configured to record and display such parameters as the actual time for a particular machine cycle or cutting cycle, the total number of cuts in a repeat cycle type test, the total time required for all cuts or machine cycles, the saw motor input current and a visual display of information provided to and being stored in the central processing unit.

In accordance with still a further aspect of the present invention, there is provided an apparatus for producing a printed report of a power saw operating condition. This report is based on certain saw operating parameters and material characteristics. Additionally, notice may be provided to the saw operator indicating possible hazards when cutting particular materials that are considered dangerous to cut with a particular saw for various reasons.

The above noted features and advantages of the present invention as well as other superior aspects thereof will be further appreciated by those skilled in the art upon reading the detailed description which follows in conjunction with the drawings.

BRIEF DESCRIPTION OF THE DRAWINGS

FIGS. 4a and 4b are examples of printed output sheets in the format of a field test analysis report;

FIG. 5 is a view of a sheet printed in the format of a saw inspection report and;

FIG. 6 is a view of a sheet printed in the format of a dangerous material notice.

DESCRIPTION OF THE PREFERRED EMBODIMENT

Figure 1:
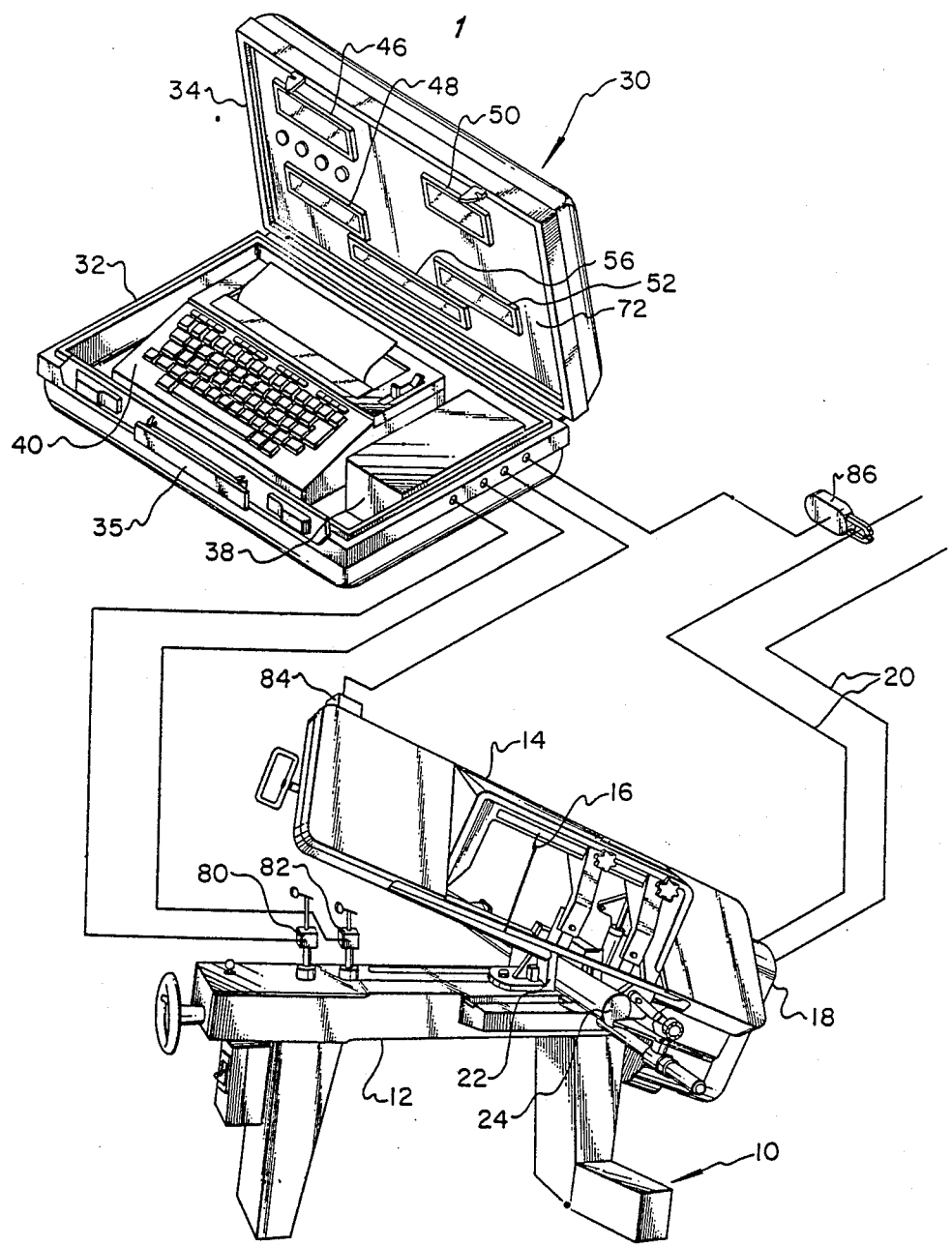
FIG. 1 is a perspective view of the saw testing and analysis apparatus of the present invention shown in an operative schematic relationship with a motor driven band saw.

In the description which follows, like parts are marked throughout the specification and drawing with the same reference numerals, respectively. The drawing figures may illustrate certain components in somewhat schematic form in the interest of clarity and conciseness.

Referring to Figure there is illustrated a motor driven band saw, generally 10 illustrative of the type of material cutting machine which has been advantageously tested and analyzed by the apparatus and method of the present invention. Motor driven saw 10 is of a type commercially available. Its conventional construction includes a bed or table 12 on which an oscillating head member 14 is mounted. Head member 14 is adapted to support a continuous or endless saw band 16 driven over spaced apart drive and idler pulleys, not shown, by an electric drive motor and transmission means 18 adapted to be in communication with a source of electric power, not shown, by motor power conductors 20. Band saw 10 includes a workpiece holding fixture 22 for holding a workpiece to be cut such as the piece of cylindrical metal bar stock 24, illustrated by way of example. Head 14 is pivotally mounted on bed 12 in a conventional manner for oscillation from the position shown in a generally counterclockwise manner, viewing FIG. 1, through a machine sawing cycle and returning to the position shown to effect complete cutting of a workpiece. Saw 10 may also include means for providing indexing movement of the workpiece to a second position for the next cutting cycle.

The overall efficiency of a metal cutting saw, such as the motor driven band saw 10, is dependent on several factors. These factors include the type of saw blade and the speed and feed settings on the band saw. Indicative characteristics of the type of saw blade being used are the blade gauge, teeth per inch of blade and tooth set. Band saw operating parameters also include blade linear or angular cutting speed and the rate of cutting in area per unit time. All of the saw blade and machine parameters must be evaluated when addressing the problem of improving cutting efficiency or troubleshooting insufficient cutting rates or machine malfunctions. In the past, the measurement analysis of the various factors involving the machine operating condition has been difficult and time consuming. If such an analysis was performed at all the cutting machine was often sent to an outside laboratory for evaluation. When attempted in house, inaccurate and unusable data was often obtained primarily due to the fact that the location of the machine was not conducive to the utilization of equipment which would provide an accurate test or a usable record.

In accordance with the present invention, a unique apparatus is provided for recording and producing written reports which document industrial motor driven saw operating conditions and parameters. The saw user is thereby provided with important information to prolong the life of the saw, to improve its rate of production or to warn of hazardous conditions.

As illustrated in FIG. 1, the apparatus of the present invention is characterized as a testing, recording and analyzing unit, generally designated by the numeral 30. The testing, recording and analyzing unit is advantageously housed in a portable carrying case 32 having a hinged cover 34. The carrying case 32 is not unlike a conventional attache or briefcase which has been slightly modified to include the components of the testing apparatus 30. If desired, legs (not shown) may be attached to the bottom of the case 32 to elevate it to a more usable working height.

Figure 2:
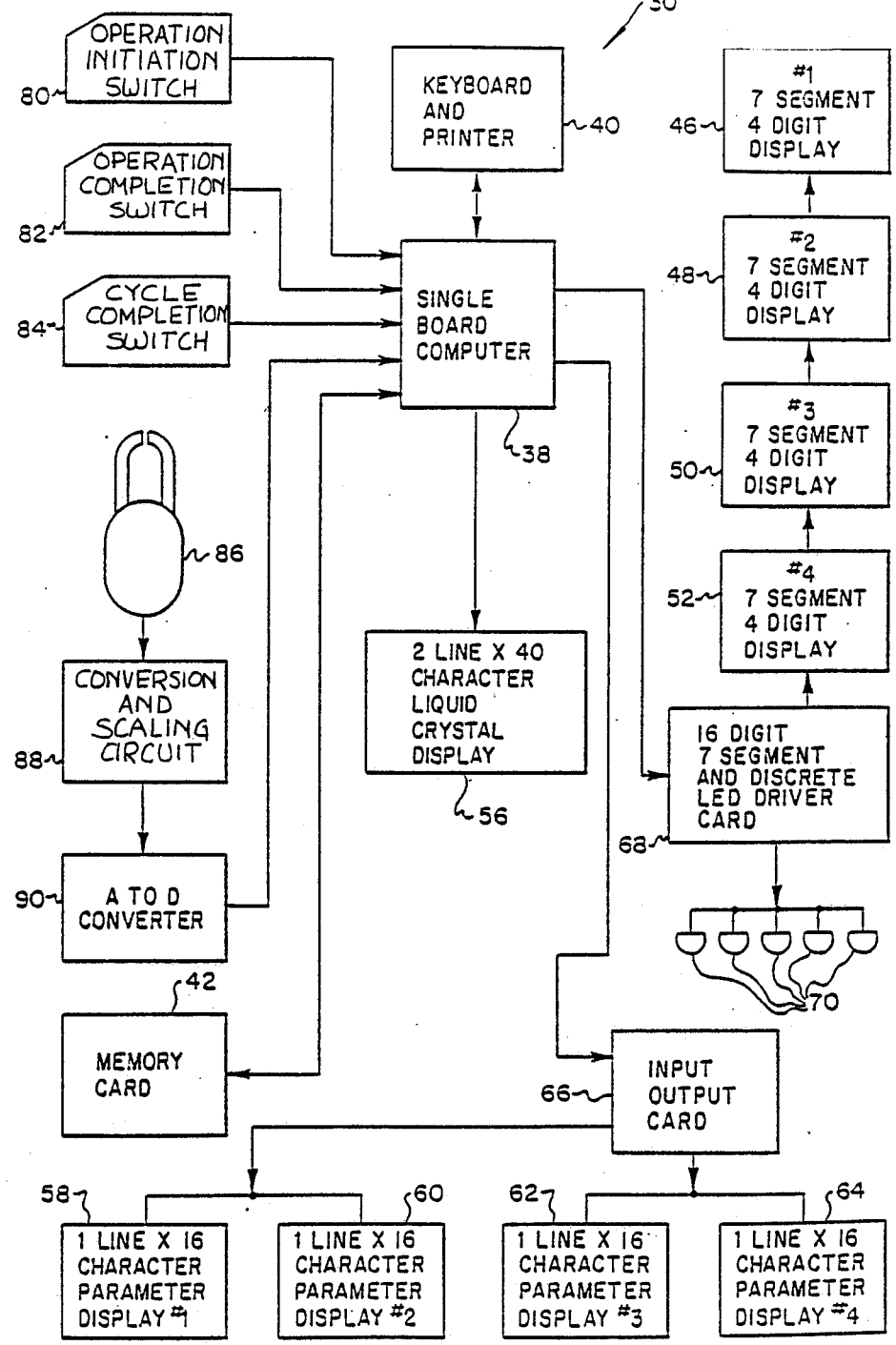
FIG. 2 is a block diagram of the operation of the saw testing and analysis apparatus.

Referring now to FIG. 2, the apparatus 30 is characterized by a general purpose computer having a central processing unit 38 which may be of a type STD-245 manufactured by Micro Link Corp., an input keyboard and printer unit 40 which may be of a type EX-440 manufactured by Computer Transceiver Systems, Inc. and such memory units as necessary to store the information to be recorded and printed in a preferred format as will be described herein. The computing unit 38 may be connected to a suitable memory unit 42 which may, for example, be of a type STD-127 manufactured by Micro-Link Corp. While the aforementioned components have been used to construct a preferred embodiment it will be understood that similar components may be used without departing from the scope of the invention.

Various operating parameters may be displayed on suitable visual digital display units 46, 48, 50 and 52. Input data and formatted information in the central processing unit 38 may also be displayed on a two-line, 40 character liquid crystal display 56 or any other suitable display screen. Additional parameter displays 58, 60, 62 and 64 are also suitably connected to the central processing unit 38 through a data input and output circuit 66. The digital display units 46, 48, 50 and 52 are also supplied with information to be displayed through a circuit card 68 which is connected to a plurality of visual indicators such as a series of light emitting diodes 70, as illustrated in FIG. 2. Other display means may be used without departing from the scope of the present invention.

Referring briefly to FIG. 1, the components of the test unit 30 are conveniently configured to provide for arrangement of the visual digital displays 46, 48, 50 and 52 mounted in a panel wall 72 in case cover 34. Central processing unit 38 and keyboard and printer unit 40 are also conveniently mounted in carrying case 32 as illustrated so that case 32 may be closed and carried by a suitable handle 35 between test sites. Apparatus 30 also includes an electric power supply, not shown, which may be battery energized or energized by connection to a source of alternating current.

Referring to FIGS. 1 and 2, apparatus 30 further includes sensing elements for detecting a complete machine operating cycle of saw 10. For example, a switch 80 may be added to indicate the initiation of a sawing operation. Another switch 82 may be added to indicate the completion of a sawing operation and a switch 84 may be added to indicate the completion of a machine operating cycle. Switches 80, 82 and 84 may be of types commercially available such as type 101XK11-Q, manufactured by Micro-Switch, Inc. or any suitable substitute. Switches 80 and 82 may be configured to be mounted on saw bed 12 and actuated on engagement with head 14 during an operating cycle thereof. Switch 84 may be actuated on completion of an operating cycle such as by return of head 14 to the starting position illustrated in FIG. 1. Switches 80, 82 and 84 are operably connected to computing unit 38 to provide start, stop and cycle complete signals to the computing unit circuitry.

Test and inspection unit 30 still further includes means for sensing and recording the load on drive motor 18. By way of example, a current measuring device 86 of a type commercially available such as a model A-60FL60HZ manufactured by Amprobe Corp. is connected to central processing unit 38 by way of a conversion and scaling circuit 88 and an A/D converter circuit 90, FIG. 2. Current measuring device 86, conversion circuit 88 and A/D converter 90 may be of types commercially available and well known in the art of electronic recording devices.

Figure 3A:
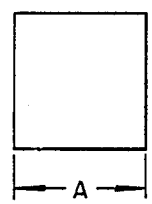
FIG. 3a through 3m are examples of material cross sectional shapes whose areas can be computed by the apparatus.
Figure 3B:
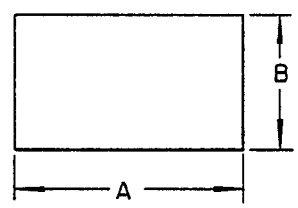
Figure 3C:
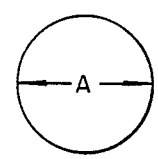
Figure 3D:
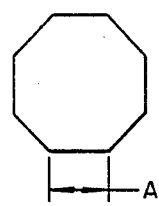
Figure 3E:
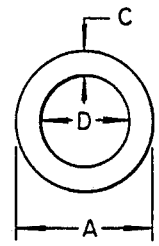
Figure 3F:
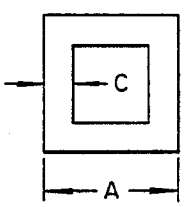
Figure 3G:
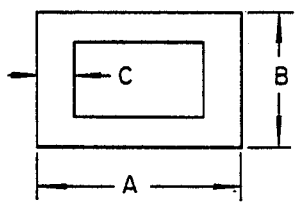
Figure 3H:
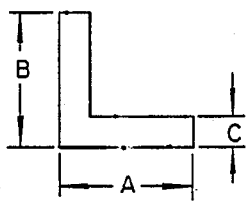
Figure 3I:
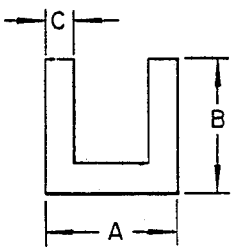
Figure 3J:
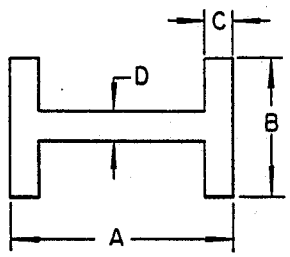
Figure 3K:
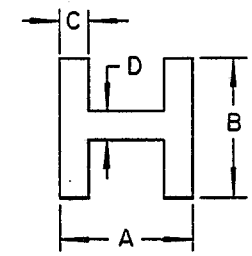
Figure 3L:
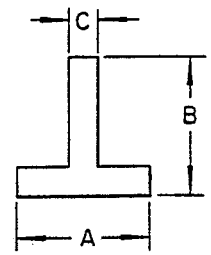
Figure 3M:
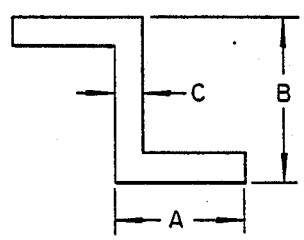

Computing unit 38 has been programmed to produce a unique set of printed reports for use in test analysis and review of machine operating conditions as a result of an inspection by the person or persons using apparatus 30. Computing unit 38 is also programmed to calculate the areas of several of the most common shapes material workpieces as shown in FIGS. 3a through 3m. FIG. 3a illustrates a square and solid cross-section workpiece having side dimension A. FIG. 3b illustrates a rectangular solid cross-section workpiece having dimensions A and B. FIG. 3c illustrates a solid cylindrical workpiece having a diameter A. FIG. 3d illustrates a hexagonal solid workpiece having a flat side of dimension A. FIG. 3e illustrates a cylindrical tube having major and minor diameters A and D and wall thickness C. FIG. 3f illustrates a square cross-section tube having outer dimension A and a wall thickness C. FIG. 3g is similar to FIG. 3f and illustrates a rectangular tubular workpiece having outer dimensions A and B and a tubing wall thickness C. FIG. 3h is an angle section workpiece having outside dimensions A and B and a section thickness C. FIG. 3i is a channel section having outside dimensions A and B and a section thickness C. FIG. 3j is an I beam section having outer dimensions A and B, a flange thickness C and a web thickness D. FIG. 3k is an H beam cross-section having outer dimensions A and B, a flange thickness C and a web thickness D. FIG. 3l is a T-section having outer dimensions A and B and section thickness C. FIG. 3m is a Z-section having outer dimensions A and B and a section thickness C.

Computing unit 38 is programmed to calculate the cross-sectional areas of the shapes illustrated in FIGS. 3a through 3m given the dimensions indicated for each of the respective shapes. In this way, for a given cutting cycle to cut a particular workpiece having one of the shapes illustrated, the total time to make a cut may be recorded based on signals sent to the computing unit from switches 80 and 82 and, with a preinput to computing unit 38 of the dimensions of the piece being cut, the cutting rate in terms of area per unit time may be computed and printed out by the computing unit.

Referring now to FIGS. 4a and 4b, computing unit 38 is preferably programmed to produce a field test analysis report similar to printed sheets 91 and 93. Other formats may be used as desired for enhanced readability or emphasis. As shown in FIGS. 5 and 6, computing unit 38 is also programmed to produce a printed inspection report 95 formatted in the manner illustrated in FIG. 5 and a dangerous material notice 97 having the format illustrated in FIG. 6. Each of the report formats may be provided with lines to indicate the test number, the date of the test and the time that the test was commenced. Such information may be put into computer 38 through keyboard 40 and printed in the format illustrated on the lines 100, 110 and 112 as indicated in FIG. 4a, FIG. 5 and FIG. 6. Referring further to FIG. 4a, computing unit 38 is programmed to receive information concerning the customer's name and address which is printed out on line 114, the individual to be contacted at the customer site on line 116, the distributor for the saw blade or other component being tested indicated on line 118 and the individual to contact indicated on line 120.

Field test analysis report sheets 91, 93 are also adapted to be printed with inputted values for blade length entered on line 122 of the printed report, blade width on line 124, blade gauge on line 126, number of teeth per inch on line 128, set of the teeth on line 130 and blade type on line 132. Respective lines are provided for machine type, model number, serial number, type of coolant being used, coolant to water ratio and machine traverse rate as indicated by the respective lines adjacent these parameters. A comment regarding customer's goal in testing may also be entered on the line indicated in FIG. 4a. The type of material and heat treatment being cut, the material standard specification, the number of pieces per cut in applications where more than one workpiece is being cut at the same time, the workpiece shape and the number of square inches per cut as indicated on line 134. Dimensions A, B, C and D may also be entered and printed on the report format illustrated in FIG. 4a.

If a blade break-in is to be run, a selected blade cutting speed in surface feet per minute may be entered on line 136. An actual cutting rate in area per unit time may also be entered and printed on line 138 and the total time per cut may be entered on line 140. Total number of cuts are recordable on line 142. If desired, the required parameters for proper blade break-in may be calculated by computer 38.

The report format illustrated in FIGS. 4a and 4b also provides for printout of the selected blade cutting rate in surface feet per minute during regular operation after blade break-in as indicated by the line 144, the actual cutting rate in area per unit time on line 146 and the total time per cut on line 148. The values assigned to the fields represented by lines 138, 140, 146 and 148 are calculated by computing unit 38 based on the total workpiece area per cut as calculated by computing unit 38 based on the workpiece dimensions entered in computing unit 38 and indicated on line 150.

Referring now to FIG. 4b, in particular, computing unit 38 is adapted to record and print on sheet 93 and in the report formal illustrated, a selected cutting rate in area per unit time for a plurality of recorded tests as illustrated, the total time per cut 161 selected based on the known area of the workpiece and the selected cutting rate, the actual cutting rate 163 based on actual tests and the actual time per cut 165 based on actual tests. As illustrated in FIG. 4b, the report format provides for indication of a slow test, a fast test and the total input current to the motor during each test. By proper command to the computing unit through the keyboard and printing unit 40, an average actual cutting rate per cut may be computed and reported on line 154 and an average actual time reported on line 156. Total area of material cut may be totalized and reported on line 158.

Computing unit 38 may also be programmed to provide a saw inspection report as illustrated in FIG. 5 wherein all of the information regarding the customer's name, distributor name, saw machine type, model and serial number, input for the test reported in accordance with the report illustrated in FIGS. 4a and 4b may be printed out on a report in accordance with the format illustrated in FIG. 5 and shown on sheet 95. The operator of test apparatus 30, upon observing the condition of saw 10, may also input a general notation regarding the condition of each of the components or operating parameters of the machine as illustrated under the heading entitled "Inspection Checklist".

Finally, upon proper command, computing unit 38 may also be operated to produce a report as shown by way of example on sheet 97, for use by the machine operator indicating the steps taken to manage cutting dangerous materials.

During the process of running one or more tests with the apparatus 30, and during such tests, digital displays 46, 48, 50 and 52 may display cutting time per machine operating cycle, total time for all cuts made, the number of cuts and the actual motor load during each cut. Visual display 56 is adapted to show the report selected so that information being input on the respective lines illustrated in FIGS. 4a, 4b, FIG. 5 and FIG. 6 may be observed.

Computing unit 38 may be programmed in assembler code or in any other suitable code to provide the data and the report formats described above and illustrated in the drawing figures. Thanks to the provision of portable carrying case 32, portable switches 80, 82 and 84 and current sensing unit 86, apparatus 30 may be easily set up to perform tests and record information in the operational area of various types of metal cutting machines tools such as band saw unit 10. In preparation for performing tests associated with the report format illustrated in FIGS. 4a and 4b, switches 80, 82 and 84 are suitably connected or arranged on saw 10 to sense the commencement of an actual cutting operation, the end of the cutting operation and the resetting of head 14 to indicate the commencement of a second test cycle. Current sensing unit 86 is suitably attached around one of leads 20 and computing unit 38 is placed in operation. Typically, the program is formatted in such a way that a user of apparatus 30 is prompted through display unit 56 to enter the data concerning the customer's name, distributor name and other particulars previously described including the particulars about the machine and blade being tested. Alternatively, the operator may select one of the program menus such as one which provides for setting the computing unit's internal clock, or selects the machine inspection checklist program, or a cross-section area calculation program or such other programs as may be input into computing unit 38.

After all of the information concerning the particulars of the machine being tested and the type of workpiece being operated on are supplied to the field test analysis program, operation of the machine such as saw 10 is commenced. Actuation of switches 80 and 82 effects measurement of the actual time to complete a cut by blade 16 through a workpiece 24 and the cutting rate in area per unit time is calculated by computing unit 38 and stored for printout on a field test analysis report at the completion of a test. Each time head 14 moves through its oscillation cycle, reset switch 84 signals computing unit 38 that the next actuation cycle of switches 80 and 82 will be the measurement of a successive test. Actuation of switch 84 also produces a signal to computing unit 38 that a complete cutting cycle has been completed and that a new cutting cycle and measurement phase is commencing.

At the completion of a test, computing unit 38 may be commanded through keyboard 40 to compute an average cutting rate and time per cut and the total area cut as a result of the tests. At the completion of a test, the field test analysis report illustrated in FIGS. 4a and 4b may be printed on command including all of the information input to computing unit 38 and calculated thereby.

Computing unit 38 may also be programmed to produce a report comprising a cost per workpiece cut analysis based on comparative blade costs, total number of cuts, an average time per cut and an applicable labor cost per workpiece or per cut and other applicable costs.

Those skilled in the art will recognize that saw test and inspection apparatus 30 provides a particularly unique and advantageous apparatus for analyzing and recording industrial metal and other material cutting operations. Although a preferred embodiment of the invention has been described herein in detail, those skilled in the art will recognize that various substitutions and modifications may be made to the specific embodiment shown without departing from the scope and spirit of the invention as recited in the appended claims.

What we claim is:

1. An apparatus for use in testing and inspecting a material cutting machine such as a motor driven band saw or the like, said apparatus comprising:

a programmable computing unit including a data entry keyboard and a document printer, said computing unit being programmable to receive, store and reproduce identifying information regarding a machine being tested, said computing unit also being programmed to calculate a cross-sectional area of a work piece being operated on by said machine;

first switch means adapted to be mounted in proximity to said machine for measuring the commencement of an operation to cut a work piece, said first switch means being operably connected to said computing unit to initiate the measurement of a period of time required to make a cut;

second switch means adapted to be mounted in proximity to said machine to signal the completion of a cutting operation, said second switch means being operably connected to said computing unit to generate a signal associated with the completion of the time required to complete a cutting operation electrical current sensing means adapted to be interposed with electrical current conductor leads connected to a motor associated with said machine;

signal conversion circuit means connected to said current sensing means for producing a signal to said computing unit which may be recorded and reproduced to indicate the current to said motor during a test on said machine;

whereby said programmable computing unit may be commanded to compute and record the actual time required to complete a cutting operation by said machine, the electrical current required to complete said cutting operation and to compute the cutting rate of the machine in terms of work piece cross-sectional area per unit time.

2. The apparatus set forth in claim 1 including:

third switch means adapted to be mounted in proximity to said machine for detecting the completion of a machine operating cycle, said third switch means being operably connected to said computing unit to signal said computing unit, the completion of an event.

3. The apparatus set forth in claim 1 including:

visual display means operably connected to said computing unit for displaying the value of motor operating current sensed by said current sensing means.

4. The apparatus set forth in claim 1 including:

visual display means operably connected to said computing unit for displaying the actual cutting time measured by said computing unit.

5. The apparatus set forth in claim 1 including:

visual display means operably connected to said computing unit for displaying the total time required to produce a plurality of cutting operations by said machine.

6. The apparatus set forth in claim 1 including:

visual display means operably connected to said computing unit for displaying the total number of machine operating cycles measured by said computing unit.

7. The apparatus set forth in claim 1 including:

a portable carrying case for supporting and enclosing said computing unit.

8. A method for analyzing the performance of a machine such as an industrial power saw or the like, comprising the steps of:

mounting a first switch means in proximity to the machine for signaling the commencement of a cutting operation;

mounting a second switch means in proximity to the machine to signal the completion of a cutting operation;

connecting said first and second switch means to a portable, hand carriable computing unit, said computing unit including a data entry keyboard and a document printer, said computing unit further being programmable to receive, store and reproduce identifying information regarding the machine being tested, said computing unit also being programmable to calculate the cross-sectional area of the work piece being operated on by the machine;

inputting at least one linear dimension of said work piece to said programmable computing unit;

inputting a cross-sectional shape designation to said programmable computing unit, and commanding said programmable computing unit to calculate the cross-sectional area of the work piece; and recording and printing the actual time required to complete a cutting operation and the cutting rate of said machine based on the input linear dimension and the measured time required to complete said cutting operation.

9. The method set forth in claim 8 including the step of:

generating a printed sheet with said computing unit and said printer wherein said sheet includes information identifying the specifications of said machine and said work piece, the actual time to cut said work piece and the cutting rate per unit time.

10. The method set forth in claim 8 including the step of:

generating a printed sheet with said computing unit and said printer wherein said sheet includes information identifying the specifications of said machine and the operating condition of said machine.

11. The method set forth in claim 8 including the step of:

generating a printed sheet with said computing unit and said printer specifying the hazards associated with cutting a particular material on a particular machine.

* * * * *